US008355091B2

(12) United States Patent
Peng (10) Patent No.: US 8,355,091 B2
(45) Date of Patent: Jan. 15, 2013

(54) ARRAY SUBSTRATE AND METHOD FOR REPAIRING BROKEN LINE OF LIQUID CRYSTAL DISPLAY (75) Inventor: Zhilong Peng, Beijing (CN)

(73) Assignee: Beijing Boe Optoelectroncis Technology Co., Ltd., Beijing (CN)

( * ) Notice: Subject to any disclaimer, the term of this patent is extended or adjusted under 35 U.S.C. 154(b) by 761 days.

(21) Appl. No.: 12/490,438

(22) Filed: Jun. 24, 2009

(65) Prior Publication Data

US 2009/0322978 A1 Dec. 31, 2009

(30) Foreign Application Priority Data

Jun. 25, 2008 (CN) .......................... 2008 1 0115594

(51) Int. Cl.
G02F 1/1333 (2006.01)
G02F 1/13 (2006.01)
(52) U.S. Cl. .......................................... 349/54; 349/192
(58) Field of Classification Search ............... 349/54–55
See application file for complete search history.

(56) References Cited

U.S. PATENT DOCUMENTS 7,929,069 B2 * 4/2011 Song ............................... 349/44
2004/0169781 A1 9/2004 Lee et al.
2007/0263134 A1 * 11/2007 Kim et al. ..................... 349/54
2008/0135857 A1 * 6/2008 Kim et al. ..................... 257/88

FOREIGN PATENT DOCUMENTS

| CN | 1142057 A | 2/1997 |
| CN | 1385827 A | 12/2002 |
| CN | 101038376 A | 9/2007 |
| JP | 08-328035 A | 12/1996 |
| JP | 09-005786 A | 1/1997 |
| JP | 2005-043639 A | 2/2005 |

* cited by examiner

Primary Examiner — Nathanael R Briggs
(74) Attorney, Agent, or Firm — Ladas & Parry LLP (57) ABSTRACT An array substrate of a LCD and a method for repairing a broken line thereof are provided. The array substrate comprises pixel regions defined by the gate lines and the data lines, and each of the pixel regions comprises a thin film transistor and a pixel electrode. At least two overlapping strips are formed between two adjacent pixel regions, one end of the overlapping strip overlap the pixel electrode within one the pixel regions, the other end thereof overlaps the pixel electrode within the other pixel regions, and the central portion thereof overlaps the gate line and/or the data line. The repairing method comprises connecting two parts of the broken gate line and/or data line on both sides of the breaking point again through the overlapping strip and the pixel electrode, and disabling the TFT corresponding to the pixel electrode by laser cutting.

19 Claims, 4 Drawing Sheets

ARRAY SUBSTRATE AND METHOD FOR REPAIRING BROKEN LINE OF LIQUID CRYSTAL DISPLAY

BACKGROUND

Embodiments of the present invention relate to a liquid crystal display, manufacturing method and repairing method thereof.

Liquid crystal displays (LCDs), which are of small volume, light weight, low power consumption and free of radiation, have prevailed in the market of flat panel display devices. Generally, a LCD comprises a thin film transistor (TFT) array substrate and a color filter substrate facing to each other and holding a liquid crystal material layer therebetween. On the array substrate, gate lines are provided for providing scan signals, data lines are provided for providing data signals and pixel electrodes are formed for the respective pixels.

A typical method for manufacturing a LCD comprises an array process of preparing the array substrate and the color filter substrate, a cell process of attaching together the array substrate and the color filter substrate with a space therebetween and injecting liquid crystal materials into the space, and module processes of attaching the prepared cell with the drivers. During the manufacturing processes described above, failure of signal line is the main kind of defects and more frequently arises compared with the failure of pixel. If the failure of signal line is found before the cell process, the defective line may be repaired by forming a bridge through a chemical vapor deposition (CVD) repairing method; however, if the failure is found after the cell process, there is still no workable method.

Since there exist a variety of cases in which a failure of line occurs, for example, a broken line defect can be found at the intersection of one data line and one gate line (either the data line or the gate line is broken) or of one date line and one common electrode line (either the common electrode line or the data line is broken), it is difficult to repair the broken line even if the CVD repairing method is employed before the cell process, which results in a low success rate of repairing and thus a low production yield. On the other hand, after the cell process, a final product having a broken line defect generally has to be discarded, which brings about great waste and increases the producing cost.

A conventional technology of providing reparation lines in the peripheral region around the pixel regions is proposed. In practice, however, the reparation lines provided in the peripheral region are of a limited number and have a great length, and only one or two broken lines can be repaired and the success rate may be low.

SUMMARY OF THE INVENTION

An array substrate of a thin film transistor liquid crystal display is provided in an embodiment of the present invention. The array substrate comprises a plurality of first signal lines parallel with each other, a plurality of second signal lines parallel with each other, a plurality of pixel regions defined by intersections between the plurality of first signal lines and the plurality of second signal lines, thin film transistors as switching devices and pixel electrodes, which are each formed in each of the plurality of pixel regions, wherein each of the thin film transistors has a first terminal connected with one of the plurality of first signal lines, a second terminal connected with one of the plurality of second signal lines and a third terminal connected with one of the pixel electrodes. At least one first overlapping strip is formed between two adjacent pixel regions in a first direction along the plurality of second signal lines, both ends of the first overlapping strip overlap the pixel electrodes within the two adjacent pixel regions, respectively, and a central portion of the first overlapping strip overlaps the first signal line between the two adjacent pixel regions; and at least one second overlapping strip is formed between two adjacent pixel regions in a second direction along the plurality of first signal lines, both ends of the second overlapping strip overlap the pixel electrodes within the two adjacent pixel regions, respectively, and a central portion of the second overlapping strip overlaps the second signal line between the two adjacent pixel regions. A method of manufacturing the array substrate described above is also provided in another embodiment of the present invention.

A method for repairing a broken line on the array substrate described above is provided in another embodiment of the present invention. The method comprises determining a breaking point on a broken first signal line or a broken second signal line; if a first signal line is broken, welding two first overlapping strips adjacent with the breaking point on the both sides of the breaking point to two corresponding pixel electrodes on a same side of the broken first signal line by laser welding, welding two first overlapping strips adjacent with the breaking point on the both sides of the breaking point to the broken first signal line by laser welding, connecting the two corresponding pixel electrodes through the second overlapping strip by laser welding, and then disabling the thin film transistors corresponding to the two corresponding pixel electrodes by laser cutting; or if a second signal line is broken, welding two second overlapping strips adjacent with the breaking point on the both sides of the breaking point to two corresponding pixel electrodes on a same side of the broken second signal line by laser welding, welding two second overlapping strips adjacent with the breaking point on the both sides of the breaking point to the broken second signal line by laser welding, connecting the two corresponding pixel electrodes through the first overlapping strip by laser welding, and then disabling the thin film transistors corresponding to the two corresponding pixel electrodes by laser cutting.

An array substrate of a thin film transistor liquid crystal display is further provided in another embodiment of the present invention. The array substrate comprises a plurality of first signal lines parallel with each other, a plurality of second signal lines parallel with each other, a plurality of pixel regions defined by intersections between the plurality of first signal lines and the plurality of second signal lines, thin film transistors as switching devices and pixel electrodes, which are each formed in each of the plurality of pixel regions, wherein each of the thin film transistors has a first terminal connected with one of the plurality of first signal lines, a second terminal connected with one of the plurality of second signal lines and a third terminal connected with one of the pixel electrodes. At least two first overlapping strips are formed between two adjacent pixel regions in a first direction along the plurality of second signal lines, both ends of the first overlapping strip overlap the pixel electrodes within the two adjacent pixel regions, respectively, and a central portion of the first overlapping strip overlaps the first signal line between the two adjacent pixel regions. A method of manufacturing the array substrate described above is also provided in another embodiment of the present invention.

A method for repairing a broken line on the array substrate described above is also provided in another embodiment of the present invention. The method comprises: determining if a breaking point on a broken first signal line is located between two first overlapping strips in the direction along the second signal line for a same pixel region; welding two first overlapping strips adjacent with the breaking point on the both sides of the breaking point to the corresponding pixel electrodes on a same side of the broken first signal line by laser welding, welding two first overlapping strips adjacent with the breaking point on the both sides of the breaking point to the broken first signal line by laser welding, and then disabling the thin film transistor corresponding to the corresponding pixel electrode by laser cutting.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the following detailed description.

BRIEF DESCRIPTION OF THE DRAWINGS

The present invention will become more fully understood from the detailed description given hereinafter and the accompanying drawings which are given by way of illustration only, and thus are not limitative of the present invention and wherein.

DETAILED DESCRIPTION OF THE PREFERRED EMBODIMENTS

Figure 1:
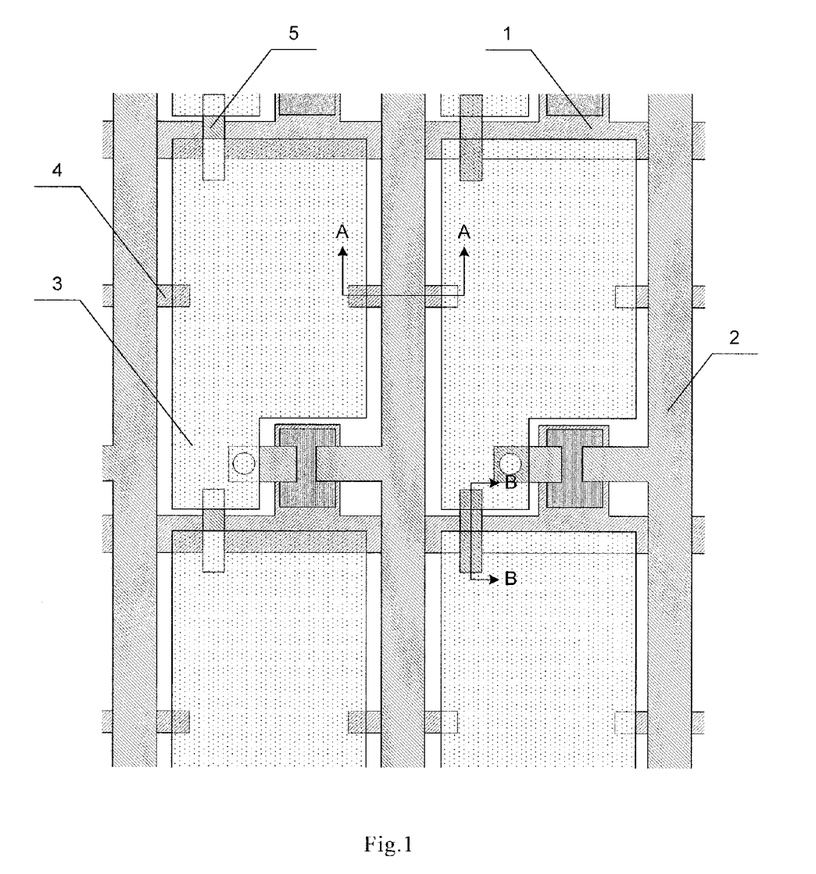
FIG. 1 is a schematic view showing a first embodiment of a pixel structure of a TFT LCD according to the present invention.
Figure 2:
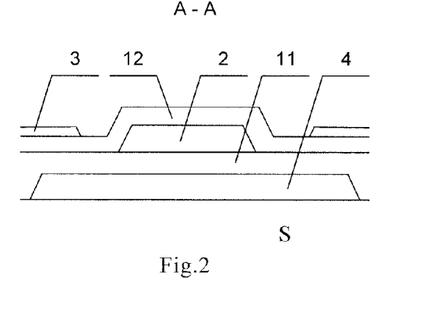
FIG. 2 is a sectional view taken along a line A-A in FIG. 1.
Figure 3:
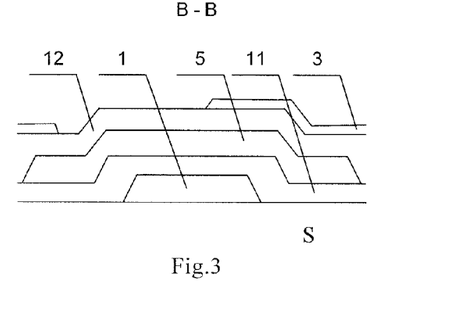
FIG. 3 is a sectional view taken along a line B-B in FIG. 2.

FIG. 1 is a schematic view showing a first embodiment of a pixel structure of a thin film transistor liquid crystal display (TFT LCD) array substrate according to the present invention, FIG. 2 is a sectional view taken along a line A-A in FIG. 1, and FIG. 3 is a sectional view taken along a line B-B in FIG. 2.

As shown in FIGS. 1~3, for example, the pixel structure of the present embodiment comprises a plurality of gate lines 1, a plurality of data lines 2, a plurality of pixel electrodes 3, and thin film transistors (TFT). The gate lines 1 and the data lines 2 intersect with each other, defining a plurality of pixel regions, and one TFT is disposed at the intersection for each pixel region. The pixel electrode 3 is formed in each of the pixel regions. Further, the pixel electrode 3 partially overlaps one gate line 1 for the pixels in the previous row such that a storage capacitor is formed between the pixel electrode 3 and the gate line 1, and this kind of pixel structure is that with storage capacitance on the gate line (Cst On Gate). For example, the TFT of the present embodiment comprises at least a gate electrode formed on a substrate and a source electrode and a drain electrode that are disposed above the gate electrode. The gate electrode is connected with the corresponding gate line 1, the source electrode is connected with the corresponding data line 2, and the drain electrode is connected with the corresponding pixel electrode 3 via a through hole in a passivation layer, for example.

In the present embodiment, at least one first overlapping strip 4 is formed between two adjacent pixel electrodes 3 in the same pixel row, and at least one second overlapping strip 5 is formed between two adjacent pixel electrodes 3 in the same pixel column. One end of the first overlapping strip 4 overlaps the pixel electrode 3 on the left side of the data line 2, the other end thereof overlaps the pixel electrode 3 on the right side of the data line 2, and the central portion thereof overlaps the data line 2. Similarly, one end of the second overlapping strip 5 overlaps the pixel electrode 3 on the upper side of the gate line 1, the other end thereof overlaps the pixel electrode 3 on the lower side of the gate line 1, and the central portion thereof overlaps the gate line 1.

In the present embodiment, one pixel region may comprise one, two or more first overlapping strips 4 with one of the adjacent pixel regions. The first overlapping strip 4 is in the same layer as the gate line 1, and both may be formed in the same patterning process. Preferably, the first overlapping strip 4 is formed parallel with the gate line 1 and with a width of more than 5 μm, and is provided between two adjacent pixel regions in the same pixel row so that a bridge structure is formed across the interposed data line 2. Specifically, as shown in FIG. 2, the first overlapping strip 4 is formed on a substrate S, a gate insulating layer 11 is formed on the first overlapping strip 4 and covers the entire substrate, the data line 2 is formed on the gate insulating line 11, a passivation layer 12 is formed on the data line 2 and covers the entire substrate, and two pixel electrodes 3 are formed on the passivation layer 12 and on the both sides of the data line 2.

Similarly, in the present embodiment, one pixel region may comprise one, two or more second overlapping strips 5 with one of the adjacent pixel regions. The second overlapping strip 5 is in the same layer as the data line 2, and both may be formed in same patterning process. Preferably, the second overlapping strip 5 is formed parallel with the data line 2 and with a width of more than 5 μm, and is provided between two adjacent pixel regions in the same pixel column so that a bridge structure is formed across the interposed gate line 1. Specifically, as shown in FIG. 3, the gate line 1 is formed on the substrate S, the gate insulating layer 11 is formed on the gate line 1 and covers the entire substrate, the second overlapping strip 5 is formed on the gate insulating line 11 and provided above the gate line 1, the passivation layer 12 is formed on the second overlapping strip 5 and covers the entire substrate, and two pixel electrodes 3 are formed on the passivation layer 12, one of which is provided on one side of the gate line 1 and the other of which is provided on the other side of the gate line 1 and partially overlaps the gate line 1.

According to the present embodiment, for example, when a break occurs on one data line during the processes of manufacturing the liquid crystal display device, the position of a breaking point on the broken data line is first determined, and then a laser welding process is employed to weld the first overlapping strip on the upper side of the breaking point to the pixel electrode on the left (or right) side of the data line, weld the first overlapping strip on the lower side of the breaking point to the pixel electrode on the left (or right) side of the data line, and connect the two pixel electrodes on the left (or right) side of the data line together through the second overlapping strip provided therebetween. Therefore, two parts of the broken data line on the both sides of the breaking point are connected again through the upper first overlapping strip, one pixel electrode, the second overlapping strip, another pixel electrode, and the lower first overlapping strip. Similarly, for example, when a break occurs on one gate line during the processes of manufacturing the liquid crystal display device, the position of a breaking point on the broken gate line is first determined, and then a laser welding process is employed to weld the second overlapping strip on the left side of the breaking point to the pixel electrode on the lower (or upper) side of the gate line, weld the second overlapping strip on the right side of the breaking point to the pixel electrode on the lower (or upper) side of the gate line, and connect the two pixel electrodes on the lower (or upper) side of the gate line together through the first overlapping strip provided therebetween. Therefore, two parts of the broken gate line on the both sides of the breaking point are connected again through the left second overlapping strip, one pixel electrode, the first overlapping strip, another pixel electrode, and the right second overlapping strip.

Although the present embodiment is described based on the pixel structure with a storage capacitor on one gate line (Cst On Gate), the invention is not limited to this example and also applicable to other pixel structures, for example, the pixel structure with a storage capacitor on one common electrode line (Cst On Common).

Figure 4:
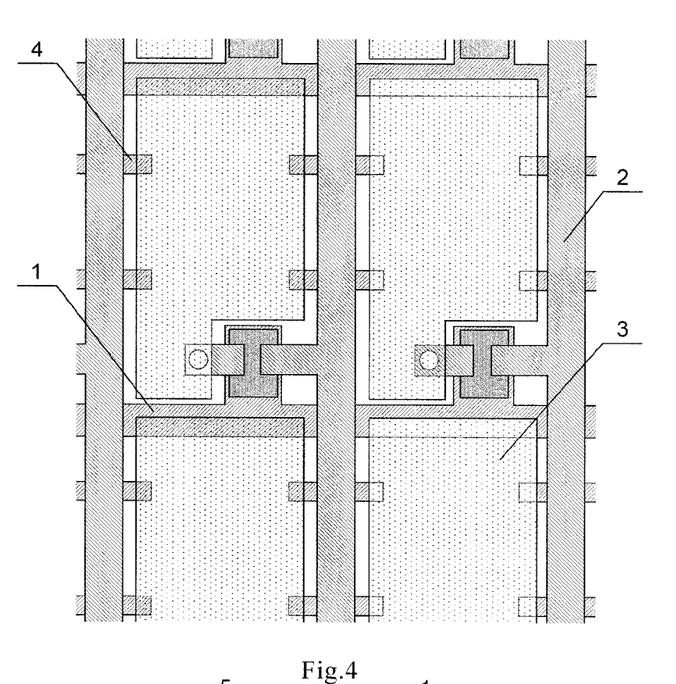
FIG. 4 is a schematic view showing a second embodiment of the pixel structure of the TFT LCD according to the present invention.

FIG. 4 is a schematic view showing a second embodiment of the pixel structure of the TFT LCD array substrate according to the present invention. As shown in FIG. 4, the pixel structure of the TFT LCD in the second embodiment is basically identical with that in the first embodiment except that at least two first overlapping strips 4 are formed between two adjacent pixel electrodes 3 in the same pixel row. The structure of each of the two first overlapping strips 4 is the same as that in the first embodiment and is not explained again for simplicity.

According to the second embodiment, for example, when a break occurs on one data line during the processes of manufacturing the liquid crystal display device, the position of a breaking point on the broken data line is first determined, and then a laser welding process is employed to weld the first overlapping strip on the upper side of the breaking point to the pixel electrode on the left (or right) side of the data line, and weld the other first overlapping strip on the lower side of the breaking point to the pixel electrode on the left (or right) side of the data line. Therefore, two parts of the broken data line on the both sides of the breaking point are connected again through the upper first overlapping strip, the pixel electrode, and the lower first overlapping strip.

In addition, the second embodiment may be combined with the first embodiment. For example, at least two first overlapping strips 4 are formed between two adjacent pixel electrodes in the same pixel row, and at least one second overlapping strip 5 is formed between two adjacent pixel electrodes in the same pixel column. When a break occurs on one data line during the processes of manufacturing the liquid crystal display device, the position of a breaking point on the broken data line is first determined. If the breaking point on the data line is located between two first overlapping strip for the same pixel electrode, the second embodiment is employed to repair the breaking point; on the other hand, if the breaking point on the data line is located between two first overlapping strip for two adjacent pixel electrodes, the first embodiment is employed to repair the breaking point, and two parts of the broken data line on the both sides of the breaking point are connected again through the first overlapping strip for one of the adjacent pixel electrodes, the second overlapping strip between the adjacent pixel electrodes, and the first overlapping strip for the other of the adjacent pixel electrodes.

Figure 5:
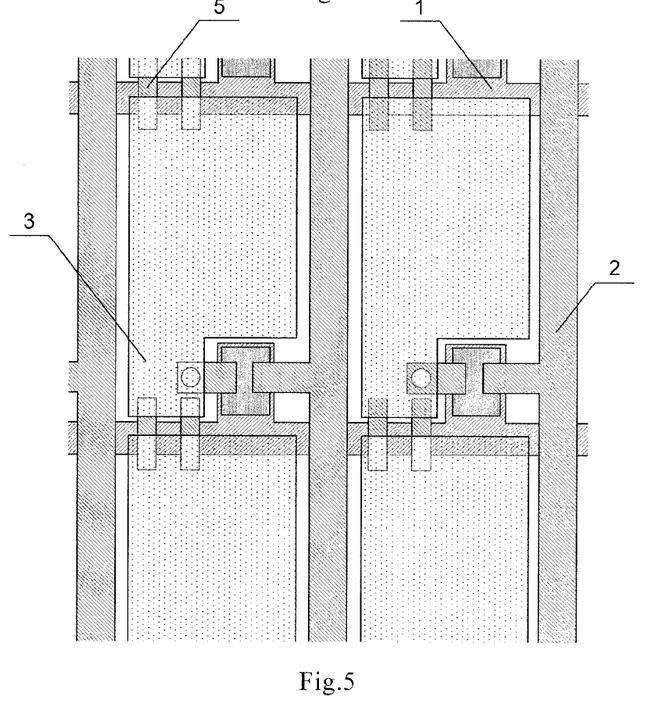
FIG. 5 is a schematic view showing a third embodiment of the pixel structure of the TFT LCD according to the present invention.

FIG. 5 is a schematic view showing a third embodiment of the pixel structure of the TFT LCD array substrate according to the present invention. As shown in FIG. 5, the pixel structure of the TFT LCD in the third embodiment is basically identical with that in the first embodiment except that at least two second overlapping strips 5 are formed between two adjacent pixel electrodes in the same pixel column. The structure of each of the two second overlapping strips is the same as that in the first embodiment and is not explained again for simplicity.

According to the third embodiment, for example, when a break occurs on one gate line during the processes of manufacturing the liquid crystal display device, the position of a breaking point on the broken gate line is first determined, and then a laser welding process is employed to weld the second overlapping strip on the left side of the breaking point to the pixel electrode on the lower (or upper) side of the gate line and weld the second overlapping strip on the right side of the breaking point to the pixel electrode on the lower (or upper) side of the gate line. Therefore, two parts of the broken gate line on the both sides of the breaking point are connected again through the left second overlapping strip, the pixel electrode, and the right second overlapping strip.

In addition, the third embodiment may be combined with the first embodiment. For example, at least one first overlapping strip is formed between two adjacent pixel electrodes in the same pixel row, and at least two second overlapping strips are formed between two adjacent pixel electrodes in the same pixel column. When a break occurs on one gate line during the processes of manufacturing the liquid crystal display device, the position of a breaking point on the broken gate line is first determined. If the breaking point on the gate line is located between two second overlapping strip for the same pixel electrode, the third embodiment is employed to repair the breaking point; on the other hand, if the breaking point on the gate line is located between two second overlapping strip for two adjacent pixel electrodes, the first embodiment is employed to repair the breaking point, and two parts of the broken gate line on the both sides of the breaking point are connected again through the second overlapping strip for one of the adjacent pixel electrodes, the first overlapping strip between the adjacent pixel electrodes, and the second overlapping strip for the other of the adjacent pixel electrodes.

It should be noted that since the pixel electrode is used as a conductive portion when the broken gate line and/or the broken data line is repaired in the embodiments described above, the process for repairing the broken line further comprises the process to disable the TFT of the corresponding pixel region(s). In the embodiments, although the overlapping strips are provided and thus the aperture ratio of the LCD is reduced to some extent, the display quality may not be affected substantially for a large-size LCD due to the acceptable reduction of the aperture ratio in the large-size LCD. As a result, the embodiments of the present invention are especially suitable for large-size LCDs, which are less affected by the aperture ratio. For example, assuming that the pixel electrode has a size of 150 μm×300 μm, four overlapping strips are provided within one pixel region and the overlapping area between each of the overlapping strip and the pixel electrode is 5 μm×5 μm, the effective area of the pixel electrode is 150

μm×300 μm−4×5 μm×5 μm=44900 μm², thereby the area of the pixel electrode is only reduced by 0.22%.

With the pixel structure of the TFT-LCD array substrate in the above-described embodiments of the present invention, overlapping strips are provided between two adjacent pixel regions, and they may be used to repair the breaking failure of either one gate line or one data line, which occurs during the processed of manufacturing the liquid crystal display. In addition, such repairing operation may be carried out at the end of the array process, or after the conventional CVD repairing method fails, or even after the cell process, and converts a signal line defect into a pixel defect.

A method of manufacturing the pixel structure according to an embodiment of the present invention will be given below. In the related field, a patterning process generally comprises coating a photoresist layer, masking, exposing and developing the photoresist layer, etching the underlying layer, lifting-off the remaining photoresist layer, and the like.

The method of manufacturing the pixel structure according to a first manufacturing method embodiment of the present invention comprises the following steps:

Step 11: a gate metal layer is deposited on a substrate and then patterned by a patterning process to form a plurality of gate lines and gate electrodes on the substrate and at least one first overlapping strip between two adjacent pixel regions in the same pixel row; one end of the first overlapping strip overlaps a pixel electrode to be formed on the left side, the other end thereof overlaps the pixel electrode to be formed on the right side and the central portion thereof overlaps the interposed data line to be formed.

Step 12: a gate insulating layer, a semiconductor layer and a doped semiconductor layer are deposited in the order on the substrate after the step 11 and then the semiconductor layer and the doped semiconductor layer are patterned by a patterning process to form an active layer (island) on the gate electrode.

Step 13: a source/drain metal layer is deposited on the substrate after the step 12 and then patterned by a patterning process to form a plurality of data lines, and source electrodes, drain electrodes, and channel regions of a plurality of TFTs, and at least one second overlapping strip between two adjacent pixel regions in the same pixel column; one end of the second overlapping strip overlaps the pixel electrode to be formed on the upper side, the other end thereof overlaps the pixel electrode to be formed on the lower side, and the central portion thereof overlaps the interposed gate line to be formed.

Step 14: a passivation layer is deposited on the substrate after the step 13 and then patterned by a patterning process to form a through hole in the passivation layer at the position of each of the drain electrodes.

Step 15: a transparent conductive layer is deposited on the substrate after the step 14 and then patterned to form the pixel electrodes; each pixel electrodes is connected with the drain electrode of the corresponding TFT via the through hole in the passivation layer.

The method of manufacturing the pixel structure according to a second manufacturing method embodiment of the present invention comprises the following steps:

Step 21: a gate metal layer is deposited on a substrate and then patterned by a patterning process to form a plurality of gate lines and gate electrodes on the substrate, and at least two first overlapping strips between two adjacent pixel regions in the same pixel row; one end of the first overlapping strip overlaps a pixel electrode to be formed on the left side, the other end thereof overlaps the pixel electrode to be formed on the right side, and the central portion thereof overlaps the interposed data line to be formed.

Step 22: a gate insulating layer, a semiconductor layer, and a doped semiconductor layer are deposited in the order on the substrate after the step 21 and then the semiconductor layer and the doped semiconductor layer are patterned by a patterning process to form an active layer (island) on the gate electrode.

Step 23: a source/drain metal layer is deposited on the substrate after the step 22 and then patterned by a patterning process to form a plurality of data lines and source electrodes, drain electrodes and channel regions of a plurality of TFTs.

Step 24: a passivation layer is deposited on the substrate after the step 23 and then patterned by a patterning process to form a through hole in the passivation layer at the position of each of the drain electrodes.

Step 25: a transparent conductive layer is deposited on the substrate after the step 24 and then patterned to form the pixel electrodes; each pixel electrode is connected with the drain electrode of the corresponding TFT via the through hole in the passivation layer.

The method of manufacturing the pixel structure according to a third manufacturing method embodiment of the present invention comprises the following steps:

Step 31: a gate metal layer is deposited on a substrate and then patterned by a patterning process to form a plurality of gate lines and gate electrodes on the substrate.

Step 32: a gate insulating layer, a semiconductor layer, and a doped semiconductor layer are deposited in the order on the substrate after the step 31 and then the semiconductor layer and the doped semiconductor layer are patterned by a patterning process to form an active layer (island) on the gate electrode.

Step 33: a source/drain metal layer is deposited on the substrate after the step 32 and then patterned by a patterning process to form a plurality of data lines and source electrodes, drain electrodes, and channel regions of a plurality of TFTs, and at least two second overlapping strips between two adjacent pixel regions in the same pixel column; one end of the second overlapping strip overlaps the pixel electrode to be formed on the upper side, the other end thereof overlaps the pixel electrode to be formed on the lower side and the central portion thereof overlaps the interposed gate line to be formed.

Step 34: a passivation layer is deposited on the substrate after the step 33 and then patterned by a patterning process to form a through hole in the passivation layer at the position of each of the drain electrodes.

Step 35: a transparent conductive layer is deposited on the substrate after the step 34 and then patterned to form the pixel electrodes; the pixel electrode is connected with the drain electrode of the corresponding TFT via the through hole in the passivation layer.

Although above embodiments are explained based on five patterning processes (or five masks for photolithography), in practice the present invention is not limited to this kind of five-mask process but also applicable to a suitable four or three-mask process because the first overlapping strip is formed at the same time with the gate line and the second overlapping strip is formed at the same time with the date line according to the embodiments.

In the embodiments of the present invention, the pixel structure of the TFT-LCD array substrate of the method for repairing a broken line in the liquid crystal display for example corresponds to the structure shown in FIGS. 1, 4 and 5 or any combination thereof. The welding process used in the embodiments of the invention is carried out by utilizing high temperature generated by laser irradiation to form a through hole in the insulating layer between the upper and the lower metal films when the upper and the lower metal films are melt together so that the two melting metal layers are connected with each other via the through hole.

The first repairing method embodiment for repairing a broken line in the liquid crystal display according to the invention comprises the following steps:

Step 111: a breaking point on the broken data line is determined.

Step 112: two adjacent pixel regions, i.e., a first pixel region and a second pixel region, in the same pixel column are selected according to the position of the breaking point; the two adjacent pixel regions are located on the same side of the data line.

Step 113: a pixel electrode within the first pixel region is welded to one corresponding first overlapping strip and the first overlapping strip is welded to the data line on one side of the breaking point by laser welding, so that the data line on one side of the breaking point is connected with the pixel electrode within the first pixel region.

Step 114: a pixel electrode within the second pixel region is welded to the other corresponding first overlapping strip and the other first overlapping strip is welded to the data line on the other side of the breaking point by laser welding, so that the data line on the other side of the breaking point is connected with the pixel electrode within the second pixel region.

Step 115: both the pixel electrode within the first pixel region and the pixel electrode within the second pixel region are welded to the same second overlapping strip formed therebetween by laser welding so that the pixel electrode in the first pixel region is connected with the pixel electrode in the second pixel region.

Step 116: the thin film transistors in the first and second pixel regions are disabled by laser cutting.

Figure 6:
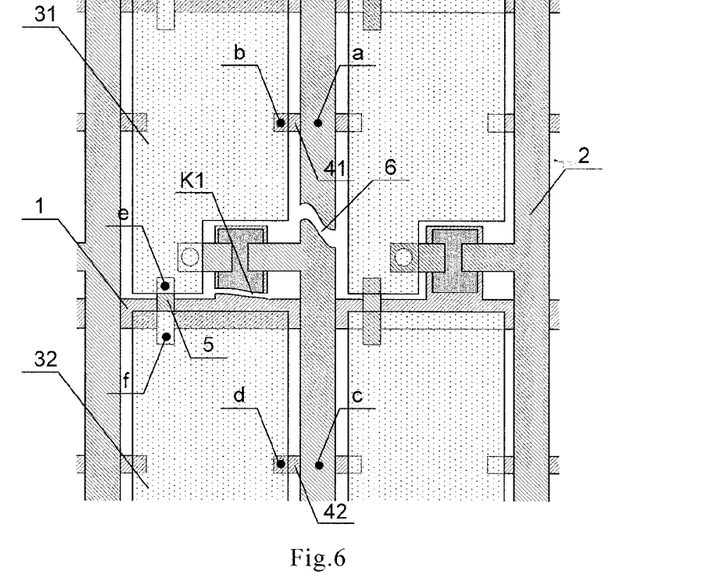
FIG. 6 is a schematic view showing a first embodiment of a method for repairing a broken line of a LCD according to the present invention.

FIG. 6 is a schematic view showing the first repairing method embodiment for repairing a broken line of the liquid crystal display device according to the present invention. As shown in FIG. 6, the pixel structure in the present embodiment is identical with that in the first embodiment of pixel structure of TFT-LCD array substrate (shown in FIG. 1) according to the present invention. If a break occurs on one data line before or after the cell process, a bright line corresponding to the data line will be found. Firstly, the breaking point 6 on the broken data line is determined. Then, two adjacent pixel regions, i.e., an upper pixel region (the first pixel region) and a lower pixel region (the second pixel region) in the same pixel column are selected according to the position of the breaking point 6. The two adjacent pixel regions are located on the same side (e.g., left side) of the data line. The first overlapping strip 41 for the upper pixel region is welded to the data line on the upper side of the breaking point 6 by laser welding, resulting in the melting point a; and the first overlapping strip 41 is welded to the pixel electrode 31 within the upper pixel region by laser welding, resulting in melting point b. Therefore, the data line on the upper side of the breaking point 6 is connected with the pixel electrode 31 through the melting point a, the first overlapping strip 41, and the melting point b. The first overlapping strip 42 for the lower pixel region is welded to the data line on the lower side of the breaking point 6 by laser welding, resulting in the melting point c; and the first overlapping strip 42 is welded to the pixel electrode 32 within the lower pixel region by laser welding, resulting in the melting point d. Therefore, the data line on the lower side of the breaking point 6 is connected with the pixel electrode 32 through the melting point c, the first overlapping strip 42, and the melting point d. The pixel electrode 31 within the upper pixel region is welded to one end of the second overlapping strip 5 by laser welding, resulting in the melting point e; and the pixel electrode 32 within the lower pixel region is welded to the other end of the second overlapping strip 5 by laser welding, resulting in the melting point f. Therefore, the pixel electrode 31 is connected with the pixel electrode 32 through the melting point e, the second overlapping strip 5, and the melting point f. In this way, two parts of the broken data line on the both sides of the breaking point 6 are connected again through the melting point a, the first overlapping strip 41, the melting point b, the pixel electrode 31, the melting point e, the second overlapping strip 5, the melting point f, the pixel electrode 32, the melting point d, the first overlapping strip 42, and the melting point c, thus the reparation of the broken data line is accomplished. Finally, the TFTs in the upper and the lower pixel regions are disabled by laser cutting, thereby the bright line failure is repaired to become a pixel failure. In addition, the present embodiment is explained in the sequence of step 113 to step 116; however, these steps may be carried out in any sequence in practice.

A second repairing method embodiment for repairing a broken line in the liquid crystal display according to the invention comprises the following steps:

Step 121: a breaking point on the broken gate line is determined.

Step 122: two adjacent pixel regions, i.e., a first pixel region and a second pixel region, in the same pixel row are selected according to the position of the breaking point; the two adjacent pixel regions are located on the same side of the gate line.

Step 123: a pixel electrode within the first pixel region is welded to a second overlapping strip and the second overlapping strip is welded to the gate line on one side of the breaking point by laser welding so that the gate line on one side of the breaking point is connected with the pixel electrode within the first pixel region.

Step 124: a pixel electrode within the second pixel region is welded to the other second overlapping strip and the other second overlapping strip is welded to the gate line on the other side of the breaking point by laser welding so that the gate line on the other side of the breaking point is connected with the pixel electrode within the second pixel region.

Step 125: both the pixel electrode within the first pixel region and the pixel electrode within the second pixel region are welded to a same first overlapping strip formed therebetween by laser welding so that the pixel electrode in the first pixel region is connected with the pixel electrode in the second pixel region.

Step 126: thin film transistors in the first and second pixel regions are disabled by laser cutting.

Figure 7:
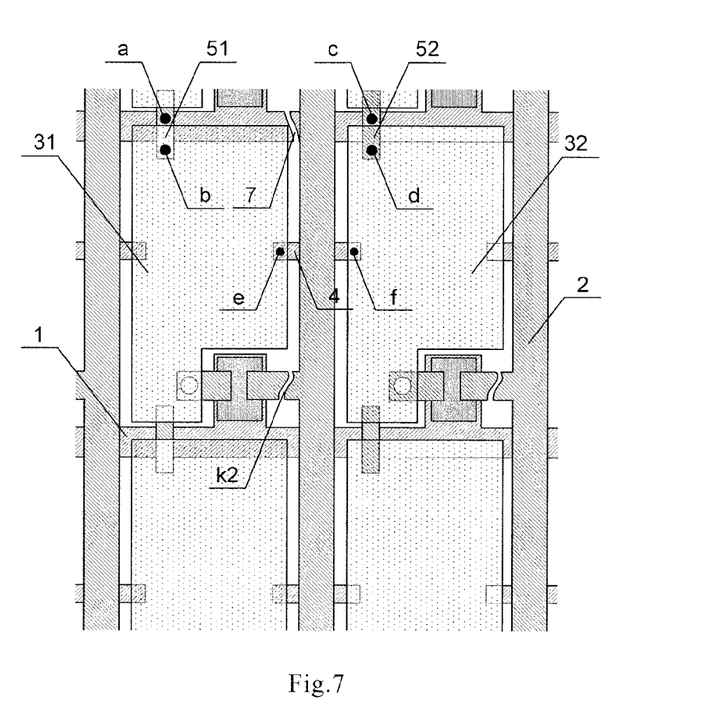
FIG. 7 is a schematic view showing a second embodiment of the method for repairing a broken line of a LCD according to the present invention.

FIG. 7 is a schematic view showing the first repairing method embodiment for repairing a broken line of the liquid crystal display device according to the present invention. As shown in FIG. 7, the pixel structure in the present embodiment is identical with that in the first embodiment of pixel structure of TFT-LCD array substrate (shown in FIG. 1) according to the present invention. If a break occurs on one gate line before or after the cell process, a bright line corresponding to the gate line will be found. Firstly, the breaking point 7 on the broken gate line is determined. Then, two adjacent pixel regions, i.e., the left pixel region (the first pixel region) and the right pixel region (the second pixel region), in the same pixel row are selected according to the position of the breaking point 7. The two adjacent pixel regions are located on the same side (e.g., lower side) of the gate line. The second overlapping strip 51 for the left pixel region is welded to the gate line on the left side of the breaking point 7 by laser welding, resulting in the melting point a; and the second overlapping strip 51 is welded to the pixel electrode 31 within the left pixel region by laser welding, resulting in melting point b. Therefore, the gate line on the left side of the breaking point 7 is connected with the pixel electrode 31 through the melting point a, the second overlapping strip 51, and the melting point b. The second overlapping strip 52 for the right pixel region is welded to the gate line on the right side of the breaking point 7 by laser welding, resulting in the melting point c; and the second overlapping strip 52 is welded to the pixel electrode 32 within the right pixel region by laser welding, resulting in the melting point d. Therefore, the gate line one the right side of the breaking point 7 is connected with the pixel electrode 32 through the melting point c, the second overlapping strip 52, and the melting point d. The pixel electrode 31 within the left pixel region is welded to one end of the first overlapping strip 4 by laser welding, resulting in the melting point e; and the pixel electrode 32 within the right pixel region is welded to the other end of the first overlapping strip 4 by laser welding, resulting in the melting point f. Therefore, the pixel electrode 31 is connected with the pixel electrode 32 through the melting point e, the first overlapping strip 4, and the melting point f. In this way, the two parts of the broken gate line on the both sides of the breaking point 7 are connected again through the melting point a, the second overlapping strip 51, the melting point b, the pixel electrode 31, the melting point e, the first overlapping strip 4, the melting point f, the pixel electrode 32, the melting point d, the second overlapping strip 52 and the melting point c, thus the repairing of the broken gate line is accomplished. Finally, the TFTs in the left and the right pixel regions are disabled by laser cutting, thereby the bright line failure is repaired to become a pixel failure. In addition, the present embodiment is explained in the sequence of step 123 to step 126; however, these steps may be carried out in any sequence in practice.

A third repairing method embodiment for repairing a broken line in the liquid crystal display according to the invention comprises the following steps:

Step 131: a breaking point on the broken data line is determined.

Step 132: a pixel region corresponding to the breaking point is selected according to the position of the breaking point.

Step 133: the data line on one side of the breaking point is welded to the first overlapping strip on the one side and the first overlapping strip is welded to a pixel electrode within the pixel region corresponding to the breaking point by laser welding, the data line on the other side of the breaking point is welded to the first overlapping strip on the other side and the first overlapping strip is welded to the pixel electrode within the pixel region corresponding to the breaking point, thereby two parts of the broken data line on the both sides of the breaking point are connected with the same pixel electrode.

Step 134: thin film transistor in the pixel region corresponding to the breaking point is disabled by laser cutting.

Figure 8:
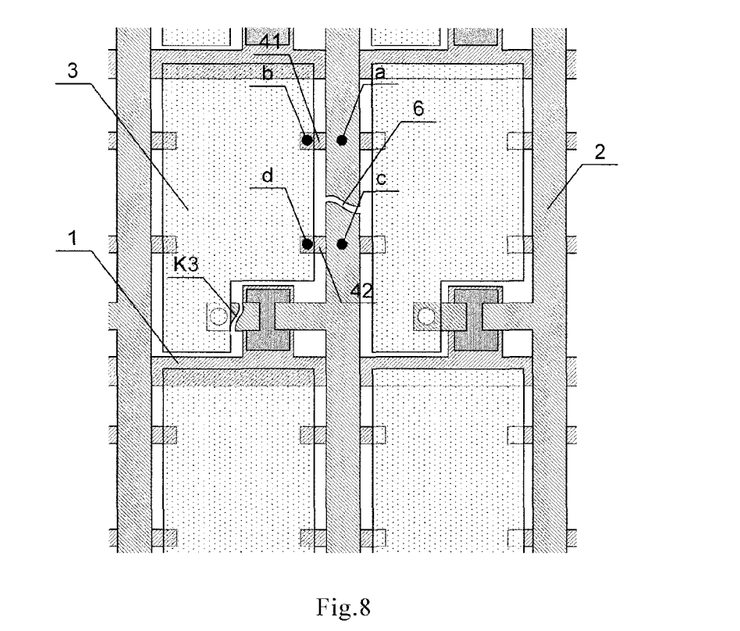
FIG. 8 is a schematic view showing a third embodiment of the method for repairing a broken line of a LCD according to the present invention.

FIG. 8 is a schematic view showing the third repairing method embodiment for repairing a broken line of the liquid crystal display device according to the present invention. As shown in FIG. 8, the pixel structure in the present embodiment is identical with that in the second embodiment of pixel structure of TFT-LCD array substrate (shown in FIG. 4) according to the present invention. Firstly, the breaking point 6 on the broken data line is determined. Then, the pixel region corresponding to the breaking point 6 is determined according to the position of the breaking point 6. The pixel region is located on one side (e.g., left side) of the data line. The first overlapping strip 41 for the pixel region corresponding to the breaking point 6 is welded to the data line on the upper side of the breaking point 6 by laser welding, resulting in the melting point a; and the first overlapping strip 41 is welded to the pixel electrode 3 within the pixel region corresponding to the breaking point 6 by laser welding, resulting in the melting point b. Therefore, the data line on the upper side of the breaking point 6 is connected with the pixel electrode 3 through the melting point a, the first overlapping strip 41, and the melting point b. The first overlapping strip 42 for the pixel region corresponding to the breaking point 6 is welded to the data line on the lower side of the breaking point 6 by laser welding, resulting in the melting point c; and the first overlapping strip 42 is welded to the pixel electrode 3 within the pixel region corresponding to the breaking point 6 by laser welding, resulting in the melting point d. Therefore, the data line on the lower side of the breaking point 6 is connected with the pixel electrode 3 through the melting point c, the first overlapping strip 42, and the melting point d. In this way, two parts of the broken data line on the both sides of the breaking point 6 are connected again through the melting point a, the first overlapping strip 41, the melting point b, the pixel electrode 3, the melting point d, the first overlapping strip 42, and the melting point c, thus the repairing of the broken data line is accomplished. Finally, the TFT in the pixel region on left side corresponding to the breaking point 6 is disabled by laser cutting, thereby the bright line failure is repaired to become a pixel failure. In addition, the present embodiment is explained in the sequence of step 133 to step 134; however, these steps may be carried out in any sequence in practice.

A fourth repairing method embodiment for repairing a broken line in the liquid crystal display according to the invention comprises the following steps:

Step 141: a breaking point on the broken gate line is determined.

Step 142: a pixel region corresponding to the breaking point is selected according to the position of the breaking point.

Step 143: the gate line on one side of the breaking point is welded to the second overlapping strip on the one side and the second overlapping strip is welded to a pixel electrode within the pixel region corresponding to the breaking point by laser welding, the gate line on the other side of the breaking point is welded to the second overlapping strip on the other side and the second overlapping strip is welded to the pixel electrode within the pixel region corresponding to the breaking point, thereby two parts of the broken gate line on the both sides of the breaking point are connected with the same pixel electrode.

Step 144: thin film transistor in the pixel region corresponding to the breaking point is disabled by laser cutting.

Figure 9:
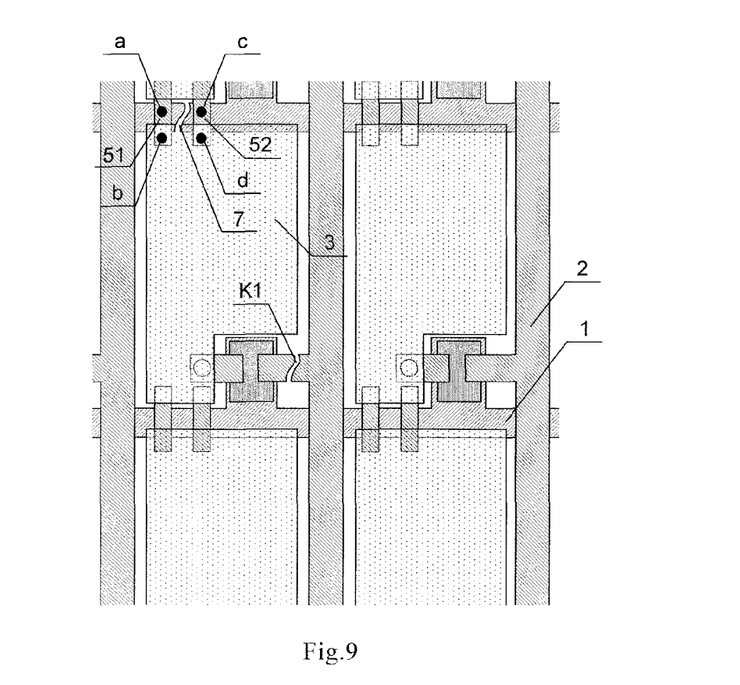
FIG. 9 is the schematic view showing a fourth embodiment of the method for repairing a broken line of a LCD according to the present invention.

FIG. 9 is a schematic view showing the fourth repairing method embodiment for repairing a broken line of the liquid crystal display device according to the present invention. As shown in FIG. 9, the pixel structure in the present embodiment is identical with that in the third embodiment of pixel structure of TFT-LCD array substrate (shown in FIG. 5) according to the present invention. Firstly, the breaking point 7 on the broken gate line is determined. Then, the pixel region corresponding to the breaking point 7 is determined according to the position of the breaking point 7, and the pixel region is located on one side (e.g., lower side) of the gate line. The second overlapping strip 51 for the pixel region corresponding to the breaking point 7 is welded to the gate line on the left side of the breaking point 7 by laser welding, resulting in the melting point a; and the second overlapping strip 51 is welded to the pixel electrode 3 within the pixel region corresponding to the breaking point 7 by laser welding, resulting in the melting point b. Therefore, the gate line on the left side of the breaking point 7 is connected with the pixel electrode 3 through the melting point a, the second overlapping strip 51, and the melting point b. The second overlapping strip 52 for the pixel region corresponding to the breaking point 7 is welded to the gate line on the right side of the breaking point 7 by laser welding, resulting in the melting point c; and the second overlapping strip 52 is welded to the pixel electrode 3 within the pixel region corresponding to the breaking point 7 by laser welding, resulting in the melting point d. Therefore, the gate line on the right side of the breaking point 7 is connected with the pixel electrode 3 through the melting point c, the second overlapping strip 52, and the melting point d. In this way, two parts of the broken gate line on the both sides of the breaking point 7 are connected again through the melting point a, the second overlapping strip 51, the melting point b, the pixel electrode 3, the melting point d, the second overlapping strip 52, and the melting point c, thus the repairing of the broken gate line is accomplished. Finally, the TFT in the pixel region corresponding to the breaking point 7 is disabled by laser cutting, thereby the bright line failure is repaired to become a pixel failure. In addition, the present embodiment is explained in the sequence of step 143 to step 144; however, these steps may be carried out in any sequence in practice.

A fifth repairing method embodiment for repairing a broken line in the liquid crystal display according to the invention comprises the following steps:

Step 151: a breaking point on the broken gate line is determined.

Step 152: if the breaking point is located between two first overlapping strips for a same pixel electrode, the step 153 is carried out; otherwise, the step 154 is carried out;

Step 153: the steps from 132 to 134 in the third repairing method embodiment for repairing the broken line in the liquid crystal display are carried out;

Step 154: the steps from 112 to 116 in the first repairing method embodiment for repairing the broken line in the liquid crystal display are carried out.

The present embodiment is the combination of the first and the third repairing method embodiment for repairing a broken line in the liquid crystal display according to the invention. In the pixel structure of the present embodiment, at least two first overlapping strips are formed between two adjacent pixel electrodes in the same pixel row, and at least one second overlapping strip is formed between two adjacent pixel electrodes in the same pixel column.

A sixth repairing method embodiment for repairing a broken line in the liquid crystal display according to the invention comprises the following steps:

Step 161: a breaking point on the broken gate line is determined.

Step 162: if the breaking point is located between two second overlapping strips for the same pixel electrode, the step 163 is carried out; otherwise, the step 164 is carried out.

Step 163: the steps from 142 to 144 in the fourth repairing method embodiment for repairing the broken line in the liquid crystal display are carried out.

Step 164: the steps from 122 to 126 in the second repairing method embodiment for repairing the broken line in the liquid crystal display are carried out.

The present embodiment is the combination of the second and the fourth repairing method embodiment for repairing a broken line in the liquid crystal display according to the invention. In the pixel structure of the present embodiment, at least two second overlapping strip are formed between two adjacent pixel electrodes in the same pixel column, and at least one first overlapping strip is formed between two adjacent pixel electrodes in the same pixel row.

In the embodiments of the present invention described above, the TFT within the corresponding pixel region is disabled by cutting off the gate electrode by laser cutting so that the gate electrode is disconnected with the gate line (e.g., the case in which a breaking point K1 of the gate electrode is formed as shown in FIG. 6), or by cutting off the source electrode by laser cutting so that the source electrode is disconnected with the data line (e.g., the case in which a breaking point K2 of the source electrode is formed as shown in FIG. 7), or by cutting off the drain electrode by laser cutting so that the drain electrode is disconnected with the pixel electrode (e.g., the case in which a breaking point K3 of the drain electrode is formed as shown in FIG. 8). Thereby, the TFT within the corresponding pixel region cannot operate any more. In addition, in the present invention, the pixel electrode within the corresponding pixel region is used as the conductive layer to connect the two parts of the broken line on the both sides of the breaking point again when the gate electrode, the source electrode or the drain electrode is cut off. Therefore, the pixel electrode within the corresponding pixel region is no longer used to display images. Thus, the corresponding pixel region becomes a light spot in the normal white mode or a dark spot in the normal black mode.

According to the method embodiments for repairing a broken line of the present invention, a method in which the broken gate line and/or the broken data line is repaired by using the overlapping strip and the pixel electrode as conductive layer and employing the laser welding process in combination with the laser cutting process is proposed. The gate line or the data line is connected with the pixel electrode through the overlapping strip as conductive layer and the overlapping strips are connected with each other through the pixel electrode as conductive layer, thereby the failure of broken line is repaired and become a pixel failure, that is, the light line failure is repaired to become a light or dark spot failure. In addition, the repairing method according to the present invention may be carried out at the end of the array process, or after the conventional CVD repairing fails, or even after the cell process by converting a signal line defect into a pixel defect. Thereby, the quality of the liquid crystal display with defect of broken line is improved, and the cost due to the waste resulting from the broken line in manufacturing the liquid crystal display is reduced. In addition, compared with the conventional CVD repairing method in which a laser welding process and a film coating process are carried out, only a laser welding process is carried out according to the method for repairing a broken line in the embodiments of the present invention. Therefore, the method in the embodiments according to the present invention is simpler, applicable to repair the broken line under complicated circumstance and has a higher success rate of repairing, and thus has a wider application prospective. The above amendments are described with reference to TFT LCD, but the present invention is not limited but appropriately applicable to other types of LCD.

The invention being thus described, it will be obvious that the same may be varied in many ways. Such variations are not to be regarded as a departure from the spirit and scope of the invention, and all such modifications as would be obvious to those skilled in the art are intended to be comprised within the scope of the following claims.

What is claimed is:

1. An array substrate of a liquid crystal display (LCD) comprising a plurality of first signal lines parallel with each other, a plurality of second signal lines parallel with each other, a plurality of pixel regions defined by intersections between the plurality of first signal lines and the plurality of second signal lines, thin film transistors as switching devices and pixel electrodes, which are each formed in each of the plurality of pixel regions, wherein each of the thin film transistors has a first terminal connected with one of the plurality of first signal lines, a second terminal connected with one of the plurality of second signal lines and a third terminal connected with one of the pixel electrodes, and wherein
  at least one first overlapping strip is formed between two adjacent pixel regions in a first direction along the plurality of second signal lines, both ends of the first overlapping strip overlap the pixel electrodes within the two adjacent pixel regions, respectively, and a central portion of the first overlapping strip overlaps the first signal line between the two adjacent pixel regions;
  at least one second overlapping strip is formed between two adjacent pixel regions in a second direction along the plurality of first signal lines, both ends of the second overlapping strip overlap the pixel electrodes within the two adjacent pixel regions, respectively, and a central portion of the second overlapping strip overlaps the second signal line between the two adjacent pixel regions,
  the at least one first overlapping strip and the at least one second overlapping strip are together used to repair a broken first signal line or a broken second signal line, and
  before repairing the broken first or second signal line, the at least one first overlapping strip and the at least one second overlapping strip are isolated components.

2. The array substrate of a LCD according to claim 1, wherein the first overlapping strip is formed in a same layer as the second signal lines.

3. The array substrate of a LCD according to claim 1, wherein the second overlapping strip is formed in a same layer as the first signal lines.

4. The array substrate of a LCD according to claim 1, wherein the first overlapping strip and the second overlapping strip have a width of more than 5 μm.

5. A method of manufacturing an array substrate of a liquid crystal display (LCD), the array substrate comprising a plurality of first signal lines parallel with each other, a plurality of second signal lines parallel with each other, a plurality of pixel regions defined by intersections between the plurality of first signal lines and the plurality of second signal lines, thin film transistors as switching devices and pixel electrodes, which are each formed in each of the plurality of pixel regions, wherein each of the thin film transistors has a first terminal connected with one of the plurality of first signal lines, a second terminal connected with one of the plurality of second signal lines and a third terminal connected with one of the pixel electrodes, and the method comprising:
  forming at least one first overlapping strip between two adjacent pixel regions in a first direction along the plurality of second signal lines, wherein both ends of the first overlapping strip overlap the pixel electrodes within the two adjacent pixel regions, respectively, and a central portion of the first overlapping strip overlaps the first signal line between the two adjacent pixel regions; and
  forming at least one second overlapping strip between two adjacent pixel regions in a second direction along the plurality of first signal lines, wherein both ends of the second overlapping strip overlap the pixel electrodes within the two adjacent pixel regions, respectively, and a central portion of the second overlapping strip overlaps the second signal line between the two adjacent pixel regions,
  wherein the at least one first overlapping strip and the at least one second overlapping strip are together used to repair a broken first signal line or a broken second signal line, and
  before repairing the broken first or second signal line, the at least one first overlapping strip and the at least one second overlapping strip are isolated components.

6. The method of manufacturing an array substrate of a LCD according to claim 5, wherein the first overlapping strip is formed in a same layer as the second signal lines with a same conductive material.

7. The method of manufacturing an array substrate of a LCD according to claim 5, wherein the second overlapping strip is formed in a same layer as the first signal lines with a same conductive material.

8. An array substrate of a liquid crystal display (LCD) comprising a plurality of first signal lines parallel with each other, a plurality of second signal lines parallel with each other, a plurality of pixel regions defined by intersections between the plurality of first signal lines and the plurality of second signal lines, thin film transistors as switching devices and pixel electrodes, which are each formed in each of the plurality of pixel regions, wherein each of the thin film transistors has a first terminal connected with one of the plurality of first signal lines, a second terminal connected with one of the plurality of second signal lines and a third terminal connected with one of the pixel electrodes, and wherein
  at least two first overlapping strips are formed between two adjacent pixel regions in a first direction along the plurality of second signal lines, both ends of the first overlapping strip overlap the pixel electrodes within the two adjacent pixel regions, respectively, and a central portion of the first overlapping strip overlaps the first signal line between the two adjacent pixel regions,
  the at least two first overlapping strips are used to repair a broken first signal line, and
  before repairing the broken first signal line, the at least two first overlapping strips are isolated from each other.

9. The array substrate of a LCD according to claim 8, wherein the first overlapping strips are formed in a same layer as the second signal lines.

10. The array substrate of a LCD according to claim 8, wherein the first overlapping strips have a width of more than 5 μm.

11. The array substrate of a LCD according to claim 8, wherein at least one second overlapping strip is formed between two adjacent pixel regions in a second direction along the plurality of first signal lines, both ends of the second overlapping strip overlap the pixel electrodes within the two adjacent pixel regions, respectively, and a central portion of the second overlapping strip overlaps the second signal line between the two adjacent pixel regions.

12. The array substrate of a LCD according to claim 11, wherein the first overlapping strips are formed in a same layer as the second signal lines.

13. The array substrate of a LCD according to claim 11, wherein the second overlapping strip is formed in a same layer as the first signal lines.

14. The array substrate of a LCD according to claim 11, wherein the first overlapping strip and the second overlapping strip have a width of more than 5 μm.

15. A method of manufacturing an array substrate of a liquid crystal display (LCD), the array substrate comprising a plurality of first signal lines parallel with each other, a plurality of second signal lines parallel with each other, a plurality of pixel regions defined by intersections between the plurality of first signal lines and the plurality of second signal lines, thin film transistors as switching devices and pixel electrodes, which are each formed in each of the plurality of pixel regions, wherein each of the thin film transistors has a first terminal connected with one of the plurality of first signal lines, a second terminal connected with one of the plurality of second signal lines and a third terminal connected with one of the pixel electrodes, and the method comprising:

forming at least two first overlapping strip between two adjacent pixel regions in a first direction along the plurality of second signal lines, wherein both ends of the first overlapping strip overlap the pixel electrodes within the two adjacent pixel regions, respectively, and a central portion of the first overlapping strip overlaps the first signal line between the two adjacent pixel regions, wherein the at least two first overlapping strips are used to repair a broken first signal line, and before repairing the broken first signal line, the at least two first overlapping strips are isolated from each other.

16. The method of manufacturing an array substrate of a LCD according to claim 15, wherein the first overlapping strip is formed in a same layer as the second signal lines with a same conductive material.

17. The method of manufacturing an array substrate of a LCD according to claim 15, further comprising forming at least one second overlapping strip between two adjacent pixel regions in a second direction along the plurality of first signal lines, wherein both ends of the second overlapping strip overlap the pixel electrodes within the two adjacent pixel regions, respectively, and a central portion of the second overlapping strip overlaps the second signal line between the two adjacent pixel regions.

18. The method of manufacturing an array substrate of a LCD according to claim 17, wherein the first overlapping strips are formed in a same layer as the second signal lines with a same conductive material.

19. The method of manufacturing an array substrate of a LCD according to claim 17, wherein the second overlapping strip is formed in a same layer as the first signal lines with a same conductive material.

* * * * *